United States Patent [19]
Giurlando et al.

[11] Patent Number: 5,398,965
[45] Date of Patent: Mar. 21, 1995

[54] PRESSURE RESPONSIVE SWITCH AND VEHICULAR AIR BAG SYSTEM USING THE SAME

[75] Inventors: Ken Giurlando; John C. Yoo; John E. Gwynn, all of Lancaster, Pa.

[73] Assignee: Bulova Technologies Inc., Lancaster, Pa.

[21] Appl. No.: 52,989

[22] Filed: Apr. 27, 1993

[51] Int. Cl.⁶ .............................................. B60R 21/32
[52] U.S. Cl. ...................................... 280/735
[58] Field of Search ............. 280/735, 741; 200/83 A, 200/83 N, 61.25, 61.26; 73/301, 715; 340/451

[56] References Cited

U.S. PATENT DOCUMENTS

| | | | |
|---|---|---|---|
| Re. 28,624 | 11/1975 | Lewis et al. | 280/736 |
| 3,774,150 | 11/1973 | Matsui et al. | 280/741 |
| 3,944,769 | 3/1976 | Wagner | 200/83 A |
| 4,049,935 | 9/1977 | Gruber | 340/451 |
| 4,951,810 | 8/1990 | Everett | 200/83 A |

*Primary Examiner*—Eric D. Culbreth
*Attorney, Agent, or Firm*—Lowe, Price, LeBlanc & Becker

[57] ABSTRACT

An air bag system has an improved temperature compensated, pressure responsive switch of construction adapted to respond to a reduction of vessel gas pressure or to the pressure of gas in the switch itself, to reliably inform the vehicle occupants of an abnormal condition. The pressure responsive switch includes a housing defining a volume that is initially at the same pressure as the pressure of the vessel, and a diaphragm in the switch housing segregating the atmospheres of the housing and vessel from each other. An electrical indication circuit in part composed of a pair of electrodes extending from the switch, helical springs in compression between the electrodes and diaphragm, and a resistor, is maintained normally electrically closed. The diaphragm is so constructed and arranged as to rupture or shear from the switch housing in response to a predetermined pressure differential. In other embodiments, an air motion sensor in the form of a movable disk or a stationary, frangible disk bearing a conductive pattern breaks the breakable element or conductive pattern to provide an indication of switch function.

49 Claims, 9 Drawing Sheets

PRESSURE RESPONSIVE SWITCH AND VEHICULAR AIR BAG SYSTEM USING THE SAME

TECHNICAL FIELD

The invention relates generally to a vehicular air bag system having a closed vessel for containing compressed gas, and more particularly, to a pressure responsive switch used in a vehicular air bag system for sensing a change of pressure in the vessel or the switch itself.

BACKGROUND ART

Recently, automotive air bag systems for protecting the occupants of a vehicle have been developed. Such systems generally include a closed vessel containing compressed gas used for inflating the air bag, a vehicle deceleration responsive valve for activating a pyrotechnic system to heat the compressed gas, a means of releasing the compressed gas into the air bag upon sudden deceleration, and a pressure responsive switch (PRS) for continuously monitoring the inside pressure of the closed vessel. When the pressure level in the closed vessel is within a predetermined range, the PRS provides an electrical signal to the automobile's electrical system so that the driver can know the air bag inflation system is in a normal condition. On the other hand, when the pressure level in the closed vessel changes sufficiently so as to become too high or too low, the PRS provides a different electrical signal to the electrical system of the automobile thereby providing a failure warning to the driver.

A conventional PRS is provided with a rigid/frangible diaphragm for separating the switch from the closed vessel. This diaphragm is designed to remain intact during normal variations in pressure differential, but fail upon a discharge of gas from the pyrotechnic system, by fracturing across its face or shearing around its secured circumference, to enable flow of gas into the bag.

The switch is designed to detect a normal difference in the vessel pressure and initiate low pressure warning when either the storage vessel has leaked or the switch itself has failed by leakage. To prevent the PRS from activating in response to pressure drop as a result of only a reduction in temperature, the PRS employs temperature compensation by implementing a reference storage volume within the switch that is filled to the same pressure as the storage vessel. Since the temperature and pressure of gas inside the switch track the temperature and pressure of gas in the vessel, the switch responds to actual pressure differential as a result of leakage of gas rather than to pressure drop due to thermal contraction or expansion of the stored gas. However, upon return of pressure to normalcy, the PRS retains no record of a previously abnormal pressure condition. Because even a temporary shift in the pressure differential may indicate an incipient defect in the system, it would be desirable to require servicing of the PRS and air bag inflation system following any significant change in pressure that is not attributable to changed ambient temperature.

DISCLOSURE OF THE INVENTION

One advantage of the invention is in improving the reliability of an air bag system having a pressure responsive switch of a type having temperature compensation so as to respond to a change in pressure due to any stimuli in a closed vessel or switch, but not both simultaneously such as is experienced when the entire vessel plus PRS system is exposed to a changing thermal environment. Another advantage is in simplifying switch construction while providing a vehicular air bag system in which the occupant will be reliably warned in advance of reduced bag inflation gas pressure. Another advantage is in requiring replacement of the PRS upon exposure to a temperature compensated pressure differential outside a predetermined range.

These and other advantages are satisfied in accordance with the invention by an air bag system having an improved temperature compensated, pressure responsive switch of construction adapted to respond to a change in vessel gas pressure or in the pressure of gas in the switch itself to reliably inform the vehicle occupants by providing electrical/electronics signals for the operation of an indicator.

The pressure responsive switch comprises a stationary switch housing and movable internal portions, the stationary portion being mounted to an element on the inner wall of the gas vessel. The interior of the switch housing defines a volume of gas having an initial pressure that is the same as the initial pressure of the interior volume of gas of the vessel. A diaphragm attached to the switch housing forms a separator between the interior volumes of the switch housing and the vessel.

In accordance with one embodiment of the invention, an electrical sensing element in the interior of the switch housing establishes an electrical circuit path when the diaphragm and the movable interior portions of the switch housing are in a first relative position, and a different electrical circuit path when the diaphragm and the moveable interior portions of the switch housing are in a second relative position. A spring can be arranged in the housing for applying a force tending to urge the interior and stationary portions of the switch toward the second relative position.

The diaphragm is constructed and arranged so as to begin to fracture or shear in response to the force of the predetermined differential in pressure between the interior of the switch housing and the vessel and then, together with the movable interior portion of the switch, separate entirely from the switch housing under the force of the spring. Preferably, a trap is arranged surrounding the diaphragm to retain the diaphragm and movable portion of the switch housing upon separation from the switch housing.

Preferably, there are two springs and each comprises a helical coil, retained in a sleeve formed on the movable portion of the switch housing. The springs, together with a resistor in the housing, establish an electrical circuit providing inputs to activate an indicator, such as a dashboard lamp. The springs are maintained in compression between the diaphragm and a pair of electrodes extending from the housing to the indicator and a source of electricity.

In another embodiment, the indicator is enabled in response to movement of an air motion sensor in the form of a disk that is positioned above the diaphragm in the path of air flow between the switch housing and vessel. Upon movement of the disk in either direction under the force of air flow through the ruptured or sheared diaphragm, the disk breaks an electrical conductor surrounding it.

In a further embodiment, the air motion sensor is in the form of a frangible stationary disk positioned above the diaphragm in the air flow path. On one surface of the disk is printed an electrical conductor forming a part of the alarm circuit. In response to a pressure differential that exceeds a predetermined potential, the diaphragm ruptures and shears. The force of gas flowing through the sheared or ruptured diaphragm will tear the disk and break the electrical conductor.

In accordance with another aspect of the invention, ports for supplying compressed gas into the vessel and switch housing are positioned side by side on an outer surface of the vessel. The outer surface of the vessel is formed with a spherical by radiused recess intersecting the fill ports, adapted to receive a welding ball for sealing the vessel, and a slot in the recess, between the ports, provides isolation between them. Two additional recesses alongside the holes are used to form a raised seat for the welding ball enabling proper welding.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

Reference will now be made in detail to the preferred embodiment of the invention, examples of which are illustrated in the accompanying drawings.

BEST MODE FOR CARRYING OUT THE INVENTION

Figure 1:
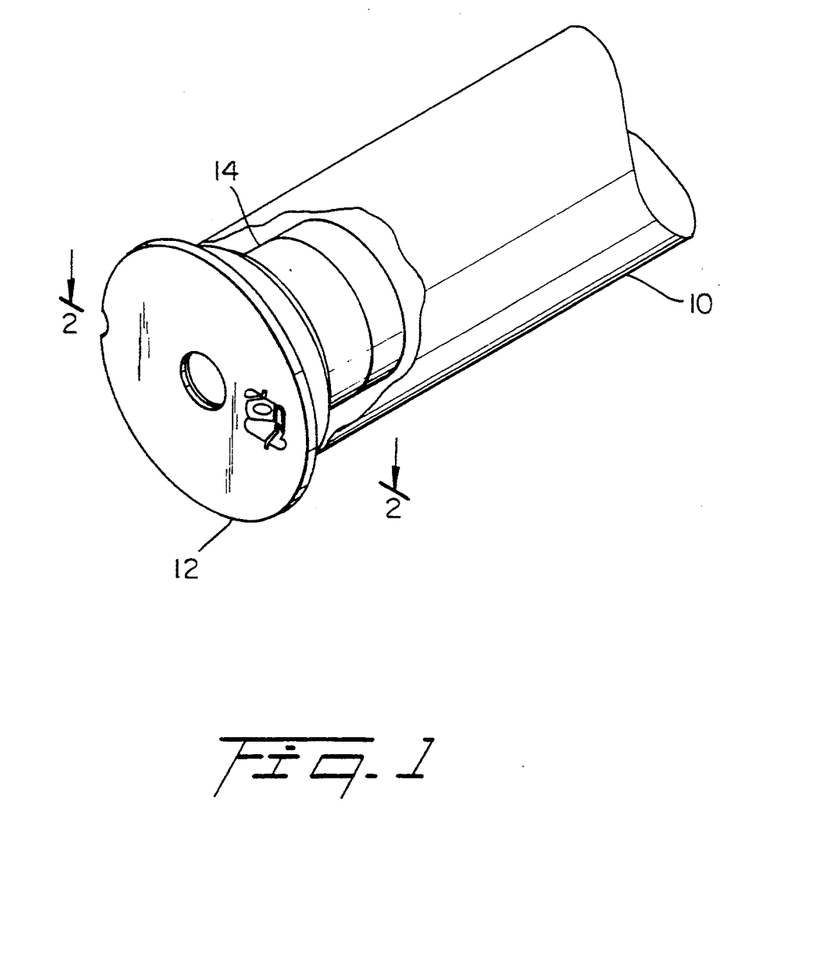
FIG. 1 is a perspective view illustrating a closed vessel according to the invention.
Figure 2:
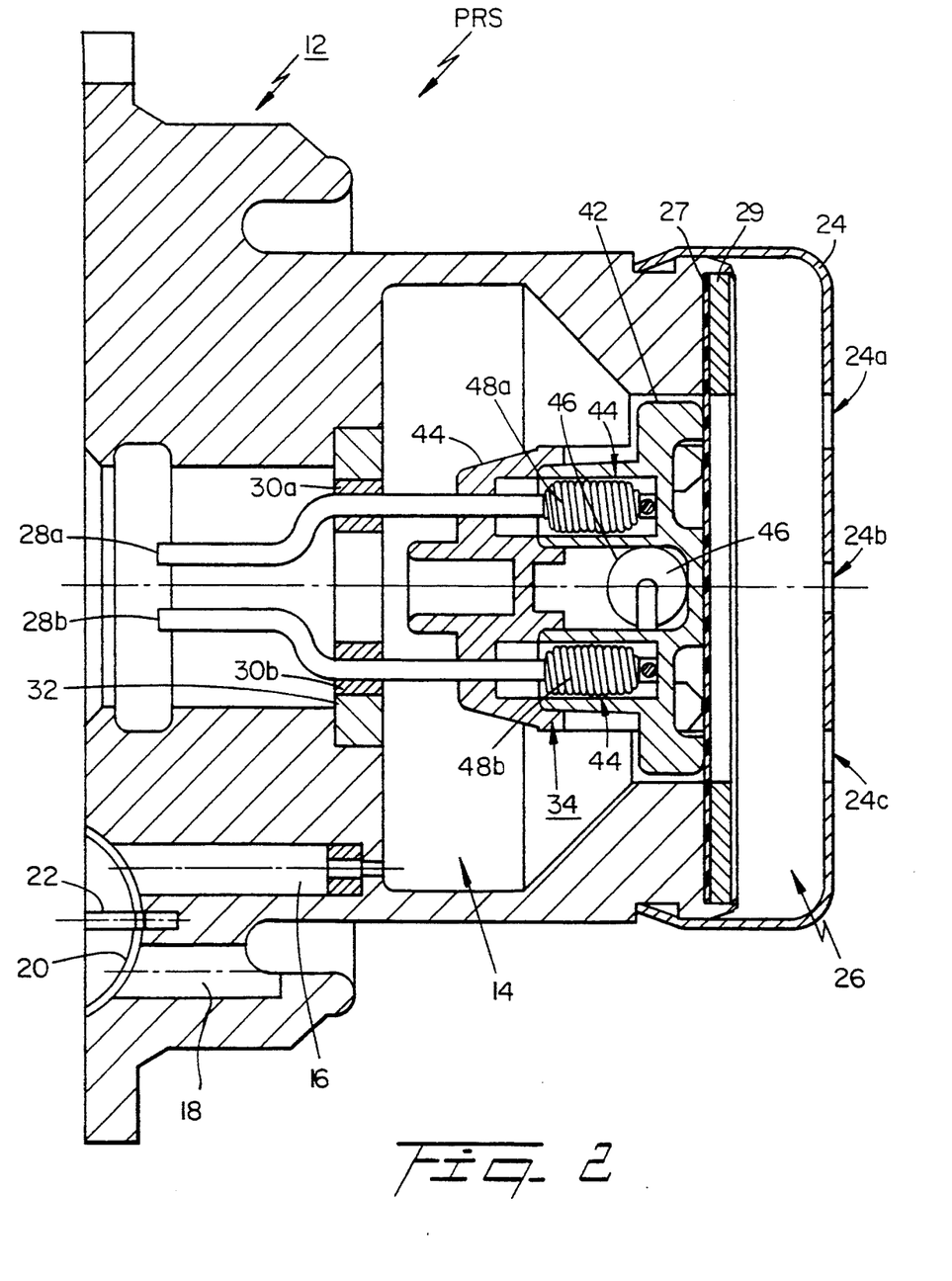
FIG. 2 is a sectional view taken along the line 2—2 of FIG. 1, with the pressure responsive switch constructed in accordance with a first embodiment of the invention, and the springs shown in a fully compressed condition.
Figure 3A:
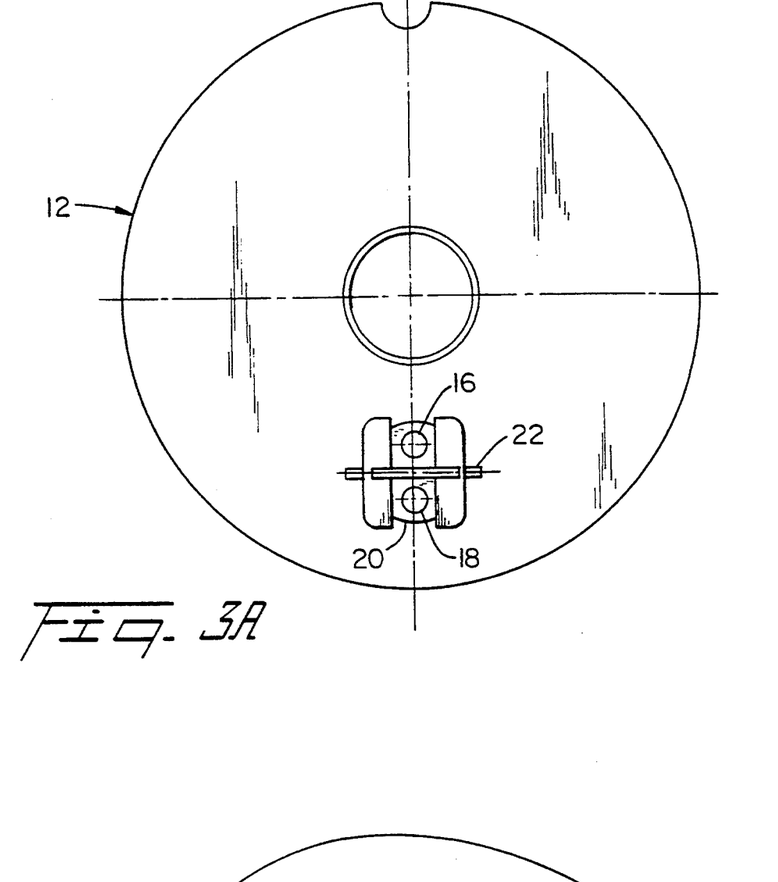
FIG. 3A is a front view of the vessel of FIG. 1.

FIG. 1 shows a closed vessel 10 used for an automotive air bag system, having one end provided with an end cap 12, a first embodiment of which is shown in FIGS. 2 and 3A. The closed vessel 10 has an initial predefined pressure value which is sufficient for inflating an air bag, not shown.

Figure 3B:
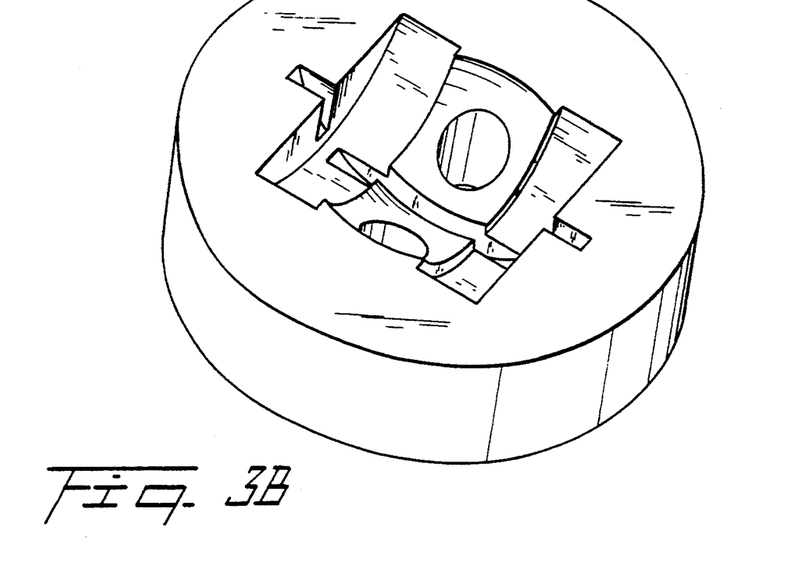
FIG. 3B is a detail showing the construction of the fill port of FIG. 3A.

End cap 12 includes a chamber 14, within the pressure responsive switch (PRS) maintained with an interior pressure the same as that of the pressure in closed vessel 10, and two fill ports (16 and 18 of FIGS. 2 and 3A,B) positioned side by side on the outer surface of the cap, for supplying compressed gas into, respectively, the chamber 14 and the inside of closed vessel 10.

FIG. 2 shows the outer surface of end cap 12 formed with a hemispherical recess 20 intersecting fill ports 16 and 18 so that a single steel ball can be used when welding the ports shut after pressurization. Hemispherical recess 20 is provided with a slot 22 to separate the two fill ports 16 and 18 to ensure that no leakage can exist between them.

The construction of fill ports 16, 18, arranged on a hemispherical by radiused platform, is shown in more detail in the perspective view of FIG. 3B. The two fill ports 16, 18 constructed and located as shown, permits the ports to be sealed simultaneously while being maintained in isolation so as to permit independent sealing around each port. Simultaneous filling of the same gas through the two ports maintains substantially equal pressure in the PRS and vessel and ensures close thermal/pressure tracking for the PRS/vessel system.

The end cap 12 is provided with a trap 24, as shown in FIG. 2. The trap 24 forms a space 26 between the interior of closed vessel 10, and the cap has multiple openings 24a–c. It captures all switch material dislodged from the PRS during operation.

The construction and operation of a conventional vehicle air bag system are well known, and for brevity, will not be described herein. The system typically includes a vehicle deceleration sensor that responds to sudden deceleration characteristic of a crash, to release compressed gas to a bag that initially is in a collapsed state in the dashboard or steering wheel of the vehicle. See, for example, U.S.P. Re. 28,624 entitled "Argon Compressed Gas Supply," incorporated herein by reference.

The pressure responsive switch PRS constructed in accordance with a first embodiment of the invention, shown in FIG. 2, is mounted to the inner wall of the vessel 10 and preferably extends from end cap 12. The PRS includes a diaphragm 27 attached to the inner surface of the end cap by a shear washer 29, establishing a boundary between the interior volumes of chamber 14 and space 26. The diaphragm 27 is preferably made of thin sheet steel, but alternatively can be formed of glass, paper, plastic or other suitable material. Attachment of the diaphragm to the washer 29 is preferably by laser welding, although other attachment methods, such as by solder, epoxy or crimping, are possible.

Two electrodes 28a and 28b, each having one end to which an automotive type connector will be later attached through end cap 12, are sealed by glass seals 30a and 30b mounted to a header 32.

Figure 5A:
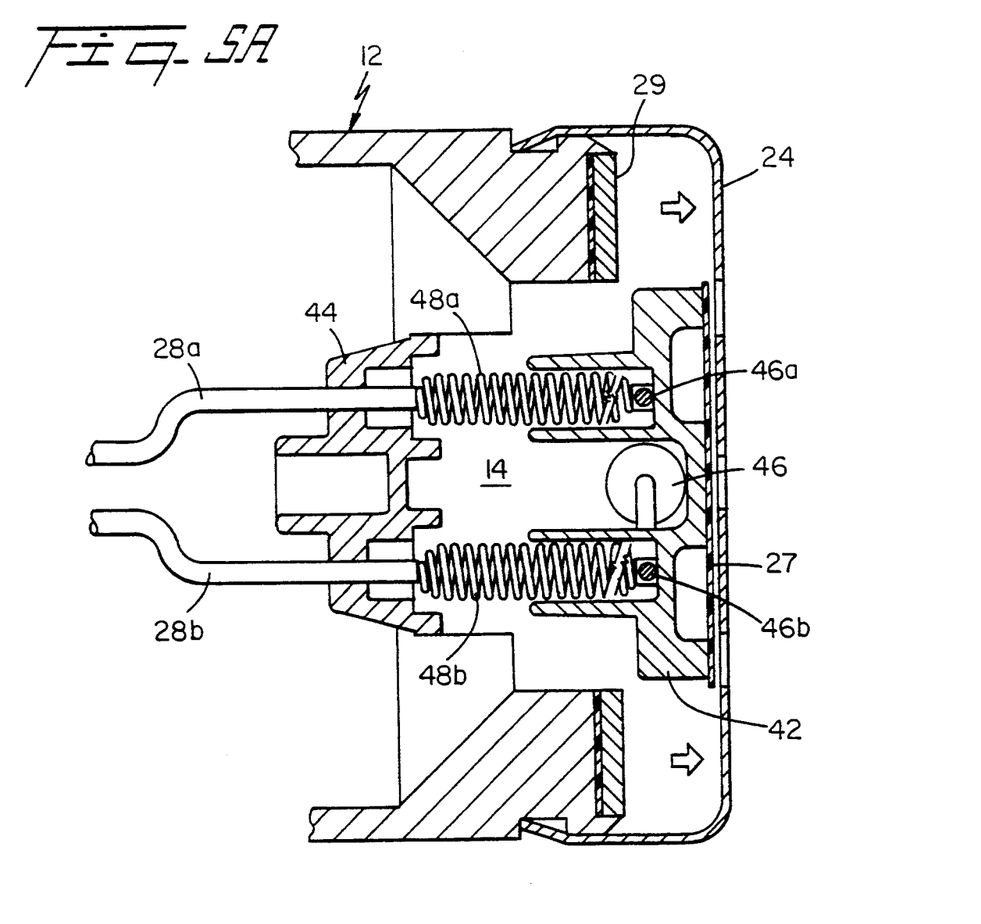
FIG. 5A is a sectional view showing the operation of the first embodiment in response to a shearing of the diaphragm.
Figure 5B:
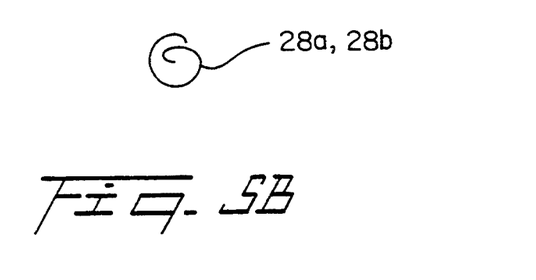
FIG. 5B is a schematic end view showing the ends of the helical springs bent across their own centers.

An important element of the pressure responsive switch PRS is a contact assembly 34, arranged in chamber 14, and including a contact base 42 abutting diaphragm 27, a spring retainer 44 and a resistor 46 having two leads 46a, 46b, arranged in contact base 42. Two metal helical springs 48a and 48b in sleeves 49 are maintained in compression between the other ends of electrodes 28a and 28b and the leads of resistor 46, respectively. The ends of the helical springs are bent to cross their own centers for electrical contact with electrodes 28a and 28b and the resistor leads as shown in FIGS. 5B. Diaphragm 27 is so constructed and arranged as to begin to shear or rupture in response to a predetermined differential in pressure between chamber 14 and space 26, indicating a leak in the switch or chamber and then shear entirely in response to the force of springs 48a,b. For example, a notch or groove may be formed along the periphery of the diaphragm 27 to assist in rupturing of the diaphragm in response to forces acting on the diaphragm in either direction. Alternatively, the diaphragm, devoid of any notch or groove, may simply shear in response to a pressure differential of predetermined magnitude.

Figure 4:
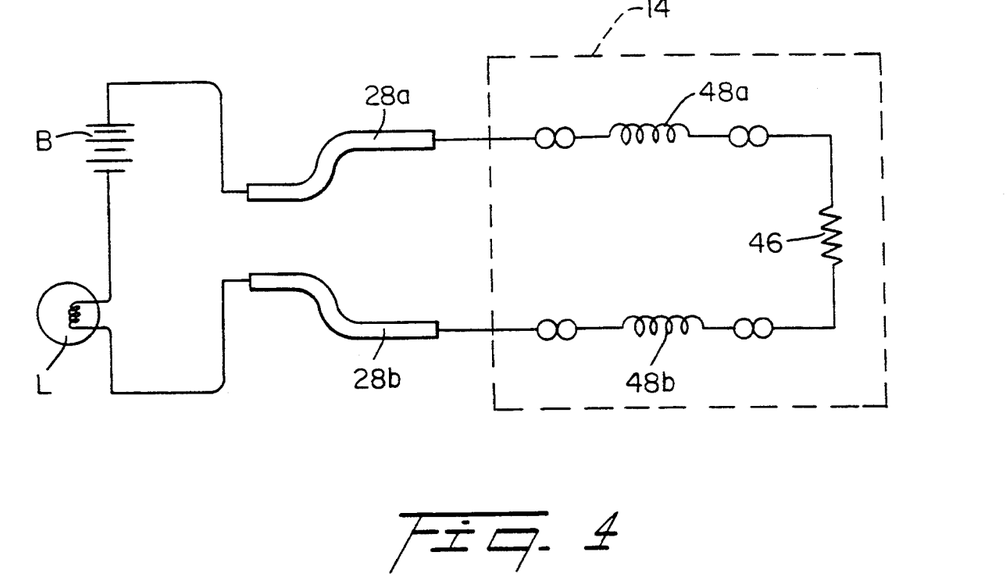
FIG. 4 is an electrical circuit diagram illustrating an equivalent circuit of the first embodiment.

In the pressure responsive switch PRS, electrodes 28a and 28b, helical springs 48a and 48b and resistor 46 form part of a warning circuit shown in FIG. 4. The warning circuit further includes a battery B and a lamp L. The battery B may be the usual vehicle battery, and the lamp is preferably mounted in the dashboard of the vehicle. The elements are connected in series. Alternatively, the warning circuit can be operated by a microprocessor (not shown) or the like having a control input connected to a circuit including the PRS.

In fabrication, header assembly 32, including electrodes 28a, 28b and two glass-to-metal seals, is welded to the inside of the end cap 12. The header assembly 32 provides the electrical interconnect to the PRS.

Contact assembly 34 housing resistor 46 and helical springs 48a and 48b are assembled by inserting the springs 48a,b in sleeves 49 and snapping spring retainer 44 onto contact base 42 resulting in initial compression of the springs. Then, contact assembly 34 is positioned in chamber 14 of end cap 12, and spring retainer 44 is welded to the inside face of the end cap. Next, diaphragm 27 is attached to the outer face of end cap 12, the diaphragm is fixed by shear washer 29, and then welded with contact base 42. Next, trap 24 is attached to the inside of end cap 12 so as to cover diaphragm 27, and shear washer 29, electrodes 28a and 28b are inserted into chamber 14 of end cap 12 through header 32 so that the end of each electrode applies a compression force to helical springs 48a and 48b, and the electrodes are sealed to the chamber by glass seals 30a and 30b.

After that, end cap 12 housing the pressure responsive switch is applied to the end of closed vessel 10 having an inside volume of normal pressure, and is sealed with the vessel by welding or the like.

Next, compressed gas is supplied into closed vessel 10 and chamber 14 through fill ports 16 and 18 so that the closed vessel and the chamber are simultaneously pressurized with gas, and the fill ports are shut by the operation of a single welding ball. At this time, little or no initial pressure variation between closed vessel 10 and chamber 14 of end cap 12 occurs. Finally, the circuit having the battery B and lamp L is connected to electrodes 28a and 28b by using a plug or the like to form the warning circuit.

Operation of the first embodiment will now be explained in conjunction with FIGS. 5A. As the pressure in closed vessel 10 drops to the predetermined level, diaphragm 27 begins to shear or rupture along the circumference of the inside diameter of shear washer 29 in response both to the force of helical springs 48a and 48b and the differential in pressure between the closed vessel and chamber 14 of end cap 12. Then, diaphragm 27 together with contact base 42 of contact assembly 34 is ejected into space 26 of trap 24, and separates entirely from end cap 12 under the force of helical springs 48a and 48b, as shown in FIG. 5A. Therefore, helical springs 48a and 48b separate from electrodes 28a and 28b and leads 46a and 46b of resistor 46, so that the warning circuit shown in FIG. 4 is opened, and lamp L is turned off. As a result, the driver of the vehicle can know of the abnormal condition of closed vessel 10. At this time, the diaphragm 27 and contact base 42 are retained by trap 24, so that closed vessel 10 is not affected by an invasion of the elements.

Figure 6A:
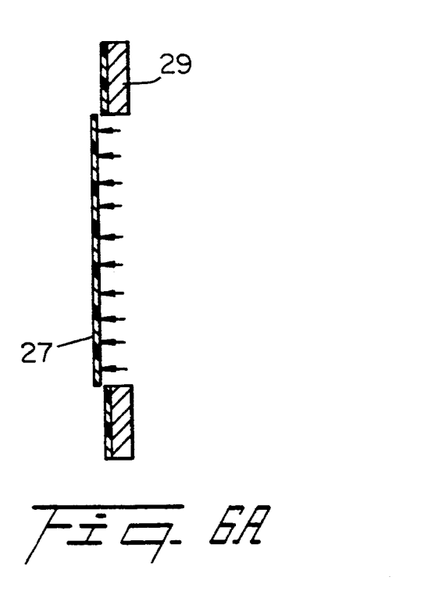
FIGS. 6A and 6B show in more detail how the diaphragm shears in response to sufficient pressure differential.
Figure 6B:
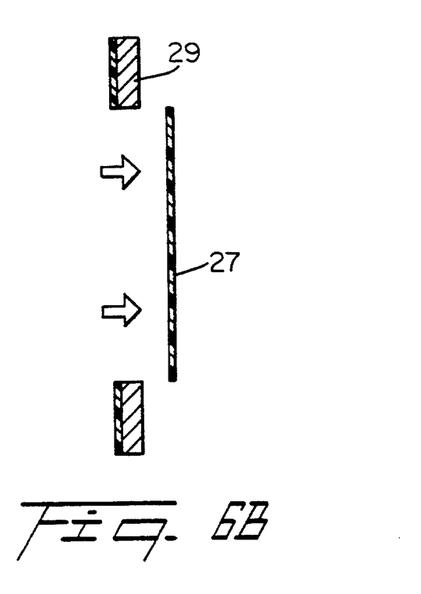

On the other hand, with reference to FIGS. 6A and 6B, if the pressure in chamber 14 of end cap 12 leaks through some portion, for instance, through glass seals 30a and 30b such that the difference exceeds a predetermined level, diaphragm 27 shears or ruptures along the circumference of the inside diameter of shear washer 29 in response to the differential in pressure between closed vessel 10 and the chamber. Then, diaphragm 27 is shifted in a direction toward the chamber 14, as shown in FIG. 6A. Immediately thereafter, diaphragm 27 together with contact base 42 of contact assembly 34, is ejected by springs 48a,b into space 26 of trap 24, as shown in FIG. 6B in the same manner as the above case shown in FIG. 5A.

Figure 7:
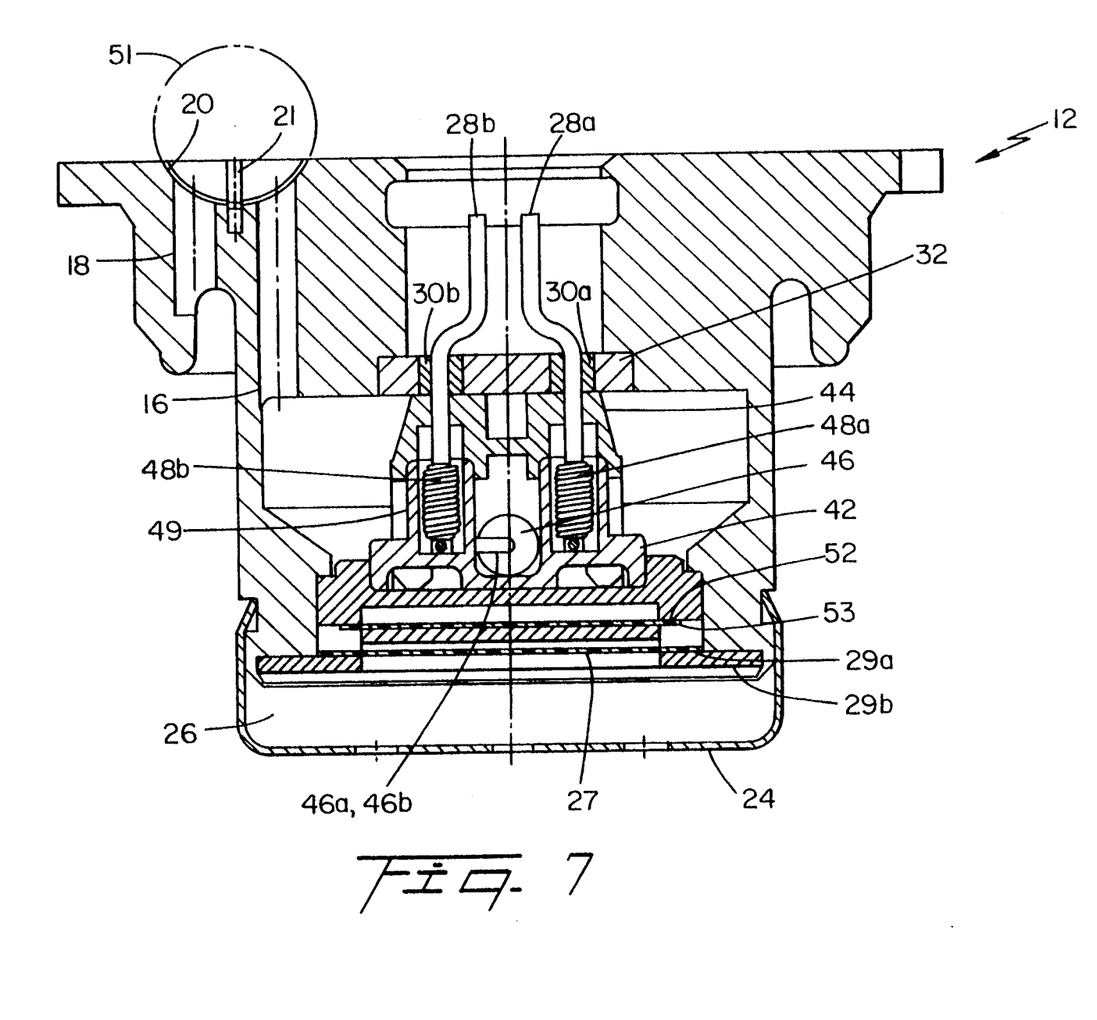
FIG. 7 is a sectional view taken along the line 2—2 of FIG. 1, with the pressure responsive switch constructed with an air movement sensor in accordance with a second embodiment of the invention.

A second embodiment of the invention is shown in FIG. 7. The PRS of FIG. 7 is similar in many respects to the embodiment of FIG. 2, and corresponding elements are identified with the same numerals. The PRS of FIG. 7 differs from that of FIG. 2 in that pressure differential is detected by an air motion sensor 52 in the form of a disk 50 attached to contact base 42, positioned on a pair of upper and lower shear washers 29a,b above diaphragm 27 and the trap 24, as shown. The sensor disk 50 moves axially in response to gas flow upon shear or rupture of the diaphragm 27. This movement of sensor disk 50 indicates that the differential in pressures of the vessel and switch has become excessive, is detected to charge the state of the alarm.

Figure 8:
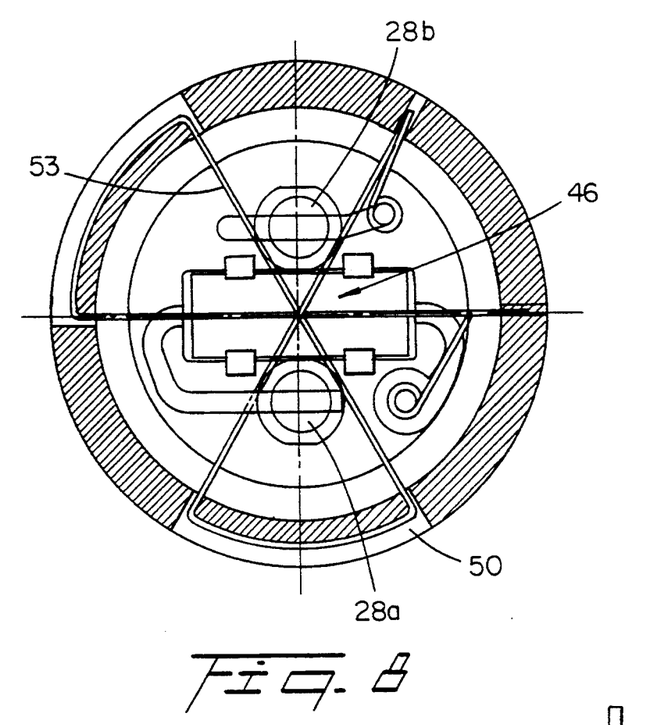
FIG. 8 is a sectional view showing in more detail the breakable element forming a part of the electrical circuit of the second embodiment.
Figure 9:
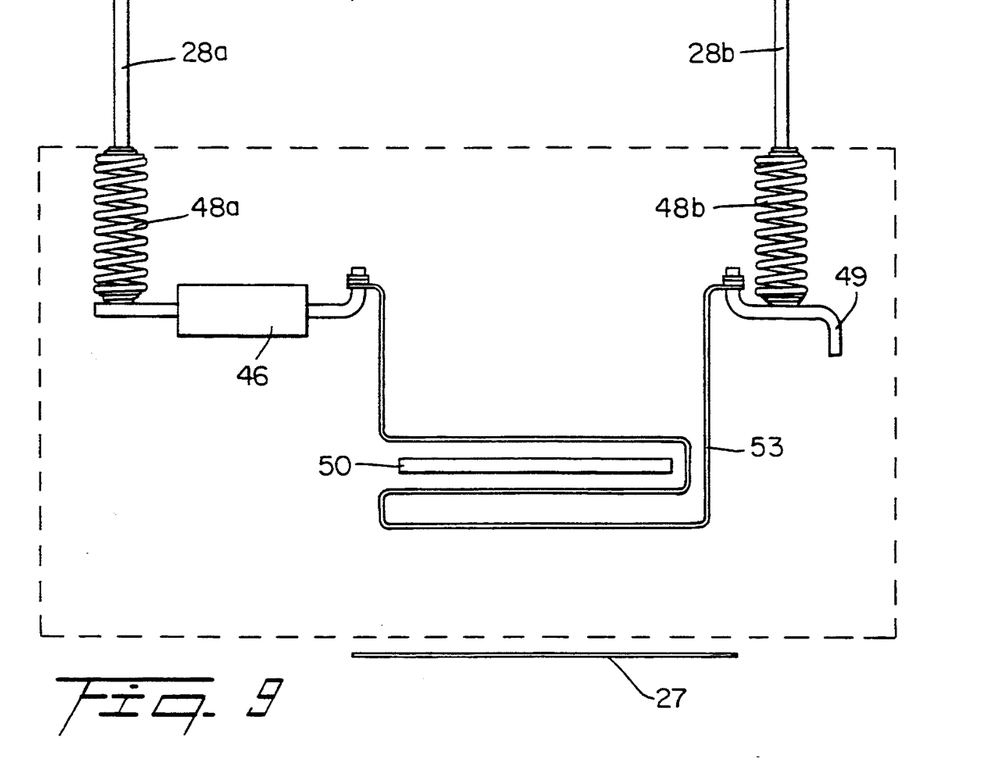
FIG. 9 is an electrical circuit diagram showing an equivalent circuit corresponding to the second embodiment.

More particularly, with reference to FIG. 9, a breakable element 53, preferably in the form of a thin conductive wire, is connected between one lead of resistor 46 and a conductive post 49 in the switch housing. Helical springs 48a,b are compressed against one lead of resistor 46 and post 49, respectively, so as to have good electrical contact. The breakable wire 53 surrounds disk 50 on three sides, as shown, with portions of the wire lying adjacent the upper and lower surfaces of the disk. The wire 53 may be routed so as to make multiple passes on one or both sides of the disk 50, as shown in FIG. 8.

The disk 50, together with breakable wire element 53, is above, and spaced slightly from, the diaphragm 27 by shear washers 29a,b. Diaphragm 27 is so constructed and arranged as to begin to shear or rupture in response to a predetermined differential in pressure between chamber 14 and space 26, as the same manner as in FIG. 2.

In fabrication, header assembly 32, including electrodes 28a, 28b and two glass-to-metal seals, is welded to the inside of the end cap 12. Contact assembly 34 housing resistor 46 and helical springs 48a and 48b is assembled by placing resistor 46 on contact base 42 and inserting the springs 48a,b in sleeves 49 and the snapping spring retainer 44 onto contact base 42. Breakable wire element 53 and disk 50 are attached to the lower end of contact base 42, and the ends of the wire are connected to one lead of resistor 46 and post 49, respectively. Then, contact assembly 34 is positioned in chamber 14 of end cap 12, so that the ends of electrodes 28a, 28b are in electrical contact with springs 48a, 48b. Next, upper shear washer 29a is installed, diaphragm 27 is placed on the outer face of end cap 12, and shear washer 29b is installed. Washer 29b and diaphragm 27 are then welded to end cap 12. Next, trap 24 is attached to the outside of end cap 12 so as to cover diaphragm 27 and shear washer 29b.

Figure 10A:
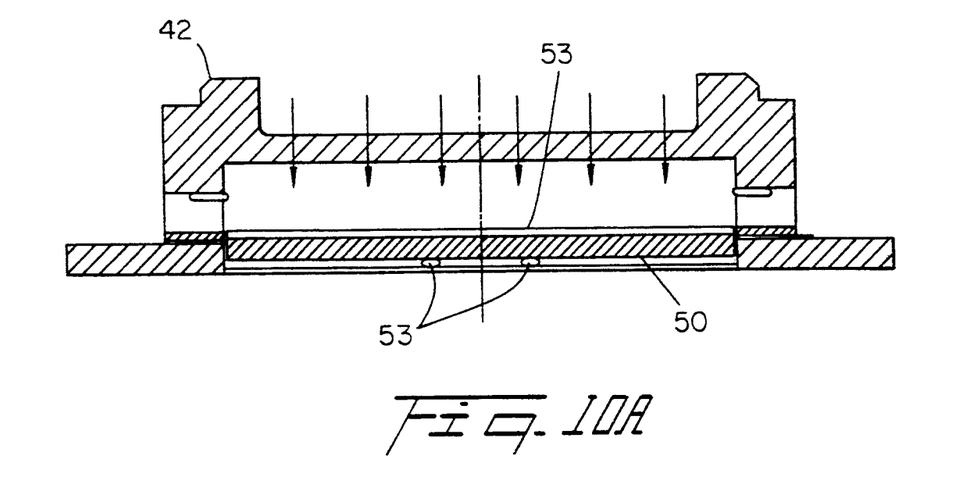
FIGS. 10A and 10B are diagrams for explaining the operation of the breakable element.

Operation of the invention in accordance with the second embodiment will now be explained in conjunction with FIGS. 10A and 10B. Considering first FIG. 10A, as the pressure in closed vessel 10 drops to a predetermined level, diaphragm 27 begins to rupture or shear in response to the force of the differential in pressure between the closed vessel and chamber 14 of end cap 12. Then, air motion sensor disk 50 is ejected into space 26 of trap 24, breaking element 53 and thereby opening the electrical switch circuit shown in FIG. 9 to change the state of the warning lamp L. As a result, the driver of the vehicle can know of the abnormal condition of closed vessel 10. At this time, the diaphragm 27 and any other LPS elements are retained by trap 24, so that closed vessel 10 is not affected by an invasion of switch elements.

Figure 10B:
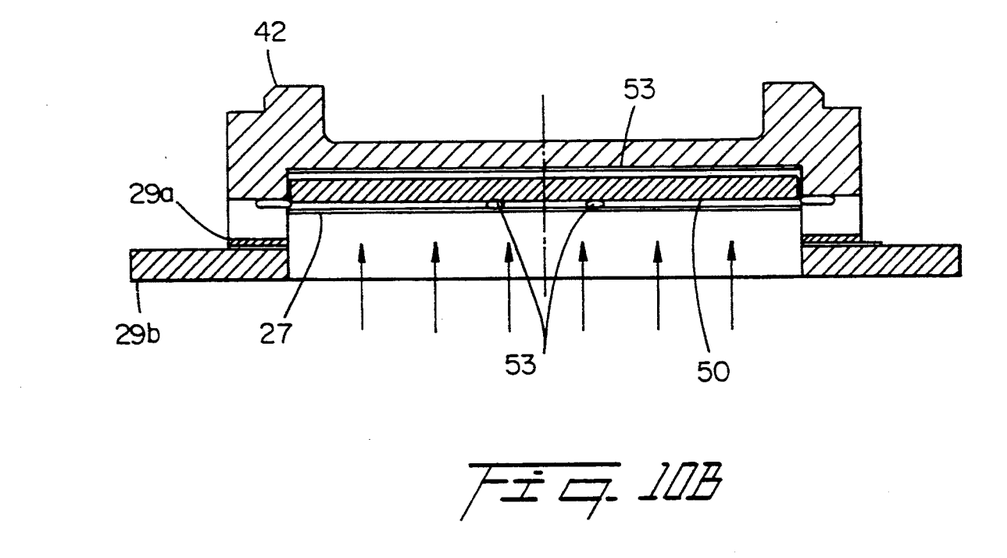

On the other hand, with reference to FIG. 10B, if the pressure in chamber 14 of end cap 12 leaks through some portion, for instance, through glass seals 30a and 30b such that the difference exceed a predetermined level, diaphragm 27 ruptures or shears as a result of the force of the differential in pressure between closed vessel 10 and the chamber 14. Then, air motion sensor disk 50 is moved in a direction toward the chamber 14, as shown, breaking element 53 thereby opening the electrical switch circuit. Again, diaphragm 27 and any other LPS elements are retained by trap 24 so that closed vessel 10 is not affected by an invasion of the switch elements.

The breakable element 53, in accordance with this embodiment, preferably is in the form of a thin wire. Alternatively, element 53 may be in the form of a conductive ribbon or other breakable, electrically conductive, medium.

Figure 11:
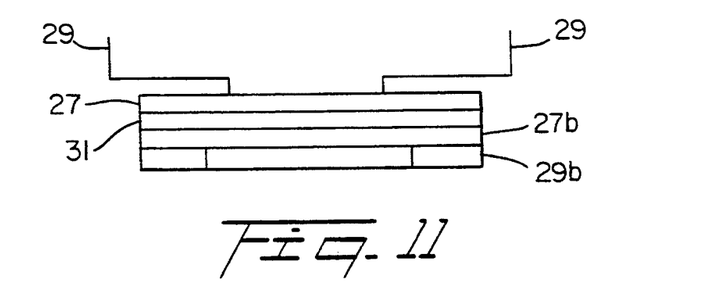
FIG. 11 depicts another embodiment of the invention, wherein the air movement sensor is in the form of a stationary disk adjacent the diaphragm and bearing a conductive pattern.

A third embodiment of the invention, disclosed in conjunction with FIG. 11, provides an air motion sensor in the form of a stationary, frangible disk 27a bearing a conductive pattern 27b, positioned above the diaphragm 27 and separated therefrom by a support washer 31. The disk 27a is formed of paper, very thin foil or other medium that is easily torn, and the conductive pattern is made of a conductive ink or other material that will tear along with the disk. Upon shear or rupture of the diaphragm 27 in response to an excessive pressure differential between the atmospheres of the PRS and vessel 10, the force of gas flowing through the diaphragm will tear the disk 27a and hence the conductive pattern printed thereon.

Figure 12:
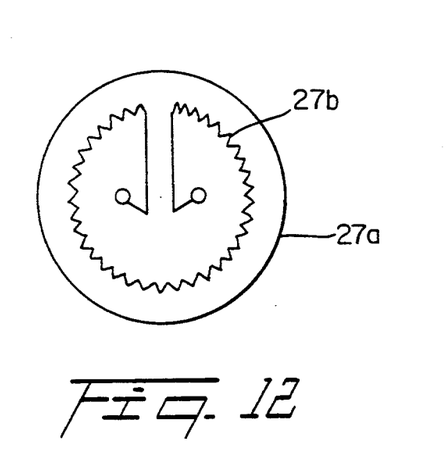
FIG. 12 shows the disk with conductive pattern in more detail.

An example of a conductive pattern 27b on disk 27a is shown in FIG. 12. Other patterns are possible. The ends of the conductive pattern 27b are connected to a pair of leads 29 that are soldered or welded to resistor 46 and post 49 of FIG. 9 so as to form an electrical circuit with springs 48a,b. In this arrangement of diaphragm 27 and disk 27a, it is the diaphragm 27 that defines the magnitude of pressure differential that will cause the PRS to function; disk 27a merely serves as an alarm or sensor that indicates that the diaphragm 27 has failed. The air motion sensing element 52, being unnecessary in this arrangement, is omitted.

Thus, the vehicle safety bag system, by virtue of the novel and improved low pressure switch as described herein, more reliably signals the occurrence of any abnormal drop in vessel pressure to the occupants so that corrective action can be taken. The novel use of electrically conductive springs or the motion of gas into or out of the LPS by virtue of a rupturable diaphragm together with ejecting springs, movable disk or electrically conductive additional diaphragm, is applied to cause a switching action that activates a warning indicator. In addition, pressurization of the LPS volume 14 and the vessel volume 10 with the same gas at the nearly the same pressures results in a reliable, low cost, temperature compensated sensing device for use in automotive air bag systems or the like.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein. For example, whereas the PRS and end cap 12 are described as being integral with each other, the PRS housing can be simply attached to the end cap or located elsewhere in the vessel. As another example, whereas a separate disk 27a functions as an air motion sensor in the embodiment of FIG. 11, an electrically conductive pattern may, if desired, be incorporated within the diaphragm 27 itself.

We claim:

1. A pressure responsive switch for sensing a reduction of pressure in a closed vessel instantaneously or over time, the pressure of the closed vessel having an initial predefined value, comprising:
    a switch housing defining a volume of an initial pressure that is the same as the initial pressure of the interior volume of the vessel;
    a diaphragm forming a separator between the interior volumes of said switch housing and said vessel;
    an electrical switch in the switch housing for establishing a closed electrical circuit path when the switch is in a first state and an open electrical circuit path when the switch is in a second state; and
    an air motion sensor that responds to the rupture or shear of the diaphragm and the resulting movement of gas into or out of the switch housing and as a result breaks a breakable element of the electrical circuit path;
    said diaphragm being constructed and arranged so as to rupture or shear in response to the force of a predetermined differential in pressure between the switch housing and vessel.

2. A pressure responsive switch according to claim 1, including spring means positioned in the switch housing between a pair of electrodes and the diaphragm.

3. A pressure responsive switch according to claim 2, wherein said spring means is made of electrically conductive material and forms part of the electrical circuit.

4. A pressure responsive switch according to claim 2, wherein said spring means comprises helical coils retained in sleeves within said switch housing.

5. A pressure responsive switch according to claim 2, further comprising a resistor in said switch housing and forming an element in said electrical circuit.

6. A pressure responsive switch according to claim 5, wherein said switch housing, said spring means and said resistor form a contact assembly.

7. A pressure responsive switch according to claim 6, further comprising electrodes which extend from said contact assembly.

8. A pressure responsive switch according to claim 7, wherein said spring means is maintained in compression between the electrodes and the resistor.

9. A pressure responsive switch according to claim 8, wherein said spring means comprise helical coils, and the ends of the helical coils are bent to cross the centers thereof for electrical contact with the electrodes and the resistor.

10. A pressure responsive switch according to claim 1, further comprising fill ports for supplying compressed gas into the vessel and switch housing, said fill ports being positioned side by side on an outer surface of the vessel.

11. A pressure responsive switch according to claim 10, wherein the outer surface of said vessel is formed with a hemispherical recess intersecting the fill ports.

12. A pressure responsive switch according to claim 11, wherein a slot is formed in the recess between said fill ports for isolation therebetween.

13. A pressure responsive switch according to claim 11 wherein two slots are formed alongside said fill ports to provide an elevated seat for a welding ball.

14. A pressure responsive switch according to claim 1, wherein said vessel includes an end cap, and said pressure responsive switch is an element thereof.

15. A pressure responsive switch according to claim 14, further comprising fill ports for supplying compressed gas into the vessel and switch housing, said fill ports being positioned side by side on the outer surface of said end cap.

16. A pressure responsive switch according to claim 15, wherein the outer surface of the end cap is formed with a hemispherical recess intersecting the fill ports.

17. A pressure responsive switch according to claim 16, wherein a slot is formed in the recess between said fill ports for isolation therebetween.

18. A pressure responsive switch according to claim 14, including a trap surrounding said diaphragm to retain said diaphragm upon displacement thereof toward said vessel.

19. A pressure responsive switch according to claim 1, including a trap surrounding said diaphragm to retain said diaphragm upon displacement thereof toward said vessel.

20. A pressure responsive switch according to claim 1, wherein said air motion sensor comprises a movable disk, and a breakable electrical conductor in a path of movement of the movable disk.

21. A pressure responsive switch according to claim 1, wherein said air motion sensor comprises a stationary disk, adjacent the diaphragm, bearing an electrically conductive pattern.

22. A vehicular air bag system, comprising:
an inflatable air bag arranged initially in a non-inflated state;
a vessel containing compressed gas at a pressure of an initial predefined value;
means for detecting a sudden deceleration of a vehicle in which the air bag system is mounted, and in response, releasing compressed gas from said vessel to inflate said air bag; and
a pressure responsive switch for sensing a reduction of pressure in the vessel instantaneously or over time, the pressure responsive switch comprising:
(1) a switch housing mounted in the vessel, wherein the interior of the switch housing defines a volume of an initial pressure that is the same as the initial pressure of the interior volume of the vessel;
(2) a diaphragm attached to the switch in said vessel and forming a separator between the interior volumes of said switch housing and said vessel;
(3) an electrical switch in the switch housing for establishing a closed electrical circuit path when the movable and stationary portions of said switch are in a first relative position and an open electrical circuit path when the movable and stationary portions of said switch are in a second relative position; and
(4) an air motion sensor displaced axially from the diaphragm in the housing for sensing the movement of gas into or out of the switch housing and breaking a breakable element of an electrical circuit;
said diaphragm being so constructed and arranged as to rupture or shear in response to the force of a predetermined differential in pressure between the switch housing and vessel.

23. A vehicular air bag system according to claim 22, including spring means positioned between the diaphragm and a pair of electrodes in said switch housing.

24. A vehicular air bag system according to claim 23, wherein said spring means is made of an electrically conductive material and forms part of the electrical circuit.

25. A vehicular air bag system according to claim 23, wherein said spring means comprises helical coils retained in sleeves within the switch housing.

26. A vehicular air bag system according to claim 23, wherein said pressure responsive switch further comprises a resistor in said switch housing and forming an element of said electrical circuit.

27. A vehicular air bag system according to claim 26, wherein said switch housing, said spring means and said resistor together form a contact assembly.

28. A vehicular air bag system according to claim 27, wherein said pressure responsive switch further comprises electrodes which extend into said contact assembly.

29. A vehicular air bag system according to claim 28, wherein said spring means is maintained in compression between the electrodes and the diaphragm.

30. A vehicular air bag system according to claim 29, wherein said spring means comprises helical coils, and the ends of the helical coils are closely spiraled inward for electrical contact with the electrodes and the resistor.

31. A vehicular air bag system according to claim 22, wherein said pressure responsive switch further comprises fill ports for supplying compressed gas into the vessel and switch housing therefrom, said fill ports being positioned side by side on an outer surface of the vessel.

32. A vehicular air bag system according to claim 31, wherein the outer surface of said vessel is formed with a hemispherical recess intersecting the fill ports.

33. A vehicular air bag system according to claim 32, wherein said pressure responsive switch includes a trap surrounding said diaphragm to retain said diaphragm upon switch function.

34. A pressure responsive switch according to claim 33, wherein a slot is formed in the recess between said fill ports for isolation therebetween.

35. A pressure responsive switch according to claim 22, wherein said air motion sensor comprises a movable disk, and a breakable electrical conductor in a path of movement of the movable disk.

36. A pressure responsive switch according to claim 35, wherein said breakable electrical conductor is a thin wire.

37. A pressure responsive switch according to claim 36, wherein the thin wire surrounds the movable disk on three sides.

38. A pressure responsive switch according to claim 36, wherein the disk has two flat round sides and the thin wire is passed on one or both of said flat round sides of the movable disk a plurality of times.

39. A pressure responsive switch according to claim 22, wherein said air motion sensor comprises a stationary disk, adjacent the diaphragm, bearing an electrically conductive pattern.

40. A vehicular air bag system according to claim 22, wherein said vessel includes an end cap, and said pressure responsive switch is mounted thereto.

41. A vehicular air bag system according to claim 40, wherein said pressure responsive switch further comprises fill ports for supplying compressed gas into the vessel and switch housing therefrom, said fill ports being positioned side by side on the outer surface of said end cap.

42. A vehicular air bag system according to claim 40, wherein the outer surface of the end cap is formed with a hemispherical recess intersecting the fill ports.

43. A vehicular air bag system according to claim 22, wherein said pressure responsive switch includes a trap surrounding said diaphragm to retain said diaphragm upon switch functioning.

44. A pressure responsive switch for sensing a change of pressure in a closed vessel instantaneously or over time, the pressure of the closed vessel having an initial predefined value, and the vessel having an end cap, comprising:
- a switch housing mounted to the end cap of the vessel, said switch housing having a volume of an initial pressure that is the same as the initial pressure of the interior volume of the vessel;
- a diaphragm attached to said switch housing, said diaphragm forming a boundary between the interior volumes of said switch housing and said vessel;
- a pair of electrodes, each electrode having one end extending from said switch housing to be connected to a circuit for warning of a reduction of pressure in the vessel and the other end extending into said switch housing;
- a contact assembly arranged in said switch housing, said contact assembly comprising
  (1) a contact base;
  (2) a spring retainer fixed to said contact base;
  (3) a resistor arranged in the contact base, the resistor having two leads and forming an element of said warning circuit; and
  (4) a pair of helical springs maintained in compression between the other ends of said electrodes and lead or leads of said resistor, respectively, the ends of the helical springs being bent to closely spiral inward thereof for electrical contact with the electrodes and the leads so as to form part of the warning circuit;
- fill ports for supplying compressed gas into the vessel and switch housing, said fill ports being positioned side by side on the outer surface of said end cap, wherein the outer surface of the end cap is formed with a hemispherical recess intersecting the fill ports; and
- a trap surrounding said diaphragm to retain said diaphragm and elements of the switch contact assembly upon functioning of the switch;
- said diaphragm being so constructed and arranged as to rupture or shear in response to the force of a predetermined differential in pressure between the switch housing and vessel.

45. A pressure responsive switch according to claim 44, wherein a slot is formed in the recess between said fill ports for isolation therebetween.

46. A pressure responsive switch for sensing a reduction of pressure in a closed vessel instantaneously or over time, the pressure of the closed vessel having an initial predefined value, comprising:
- a switch housing having stationary and movable portions, the stationary portion being mounted in the vessel, wherein the interior of the switch housing defines a volume having an initial pressure that is the same as the initial pressure of the interior volume of the vessel;
- a diaphragm attached to the movable portion of said switch and to a mounting element in said vessel and forming a separator between the interior volumes of said switch housing and said vessel;
- an electrical switch in the switch housing for establishing a closed electrical circuit path when the movable and stationary portions of said switch are in a first relative position and an open electrical circuit path when the movable and stationary portions of said switch are in a second relative position; and
- spring means in the housing for applying a force tending to urge said movable and stationary portions of said switch to said second relative position;
- said diaphragm being so constructed and arranged as to rupture or shear in response to the force of a predetermined differential in pressure between the switch housing and vessel, and then, together with the movable portion of said switch, separate entirely from the mounting element of said vessel under the force of said spring means.

47. A pressure responsive switch according to claim 46, wherein said spring means comprises helical coil springs in compression between the stationary and movable portions of said switch.

48. A pressure responsive switch according to claim 47, wherein said spring means is made of an electrically conductive material and forms a part of the electrical circuit path.

49. A pressure responsive switch according to claim 48, including a trap surrounding said diaphragm to retain said diaphragm and said movable portion of said switch housing upon separation thereof from said mounting element.

* * * * *